(12) United States Patent
Jackson

(10) Patent No.: US 8,382,027 B2
(45) Date of Patent: Feb. 26, 2013

(54) ADJUSTABLE SERVOMECHANISM ASSEMBLIES AND ASSOCIATED SYSTEMS AND METHODS

(75) Inventor: Clifford Jackson, White Salmon, WA (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 13/556,931

(22) Filed: Jul. 24, 2012

(65) Prior Publication Data

US 2012/0325959 A1    Dec. 27, 2012

Related U.S. Application Data

(62) Division of application No. 12/406,908, filed on Mar. 18, 2009, now Pat. No. 8,235,327.

(51) Int. Cl.
 *B64D 45/00* (2006.01)
(52) U.S. Cl. ...................................................... 244/1 R
(58) Field of Classification Search .................. 244/1 R, 244/99.2, 99.3, 90 R, 87
See application file for complete search history.

(56) References Cited

U.S. PATENT DOCUMENTS

| | | | |
|---|---|---|---|
| 1,990,990 A * | 2/1935 | Hathorn | 74/519 |
| 2,315,110 A | 3/1943 | Dornier | |
| 2,911,509 A | 11/1959 | Millerwise | |
| 3,309,588 A | 3/1967 | Martin et al. | |
| 3,713,162 A | 1/1973 | Munson et al. | |
| 3,950,686 A | 4/1976 | Randall | |
| 4,078,750 A | 3/1978 | Tomlinson | |
| 4,103,848 A | 8/1978 | Johnson, Jr. et al. | |
| 5,358,353 A * | 10/1994 | Schremmer et al. | 403/196 |
| 5,492,024 A | 2/1996 | Siner | |
| 5,762,439 A * | 6/1998 | Siner | 403/359.6 |
| 5,774,932 A | 7/1998 | Mallory et al. | |
| 5,806,805 A | 9/1998 | Elbert et al. | |
| 5,913,492 A | 6/1999 | Durandeau et al. | |
| 6,056,237 A | 5/2000 | Woodland | |
| 6,056,327 A | 5/2000 | Bouldin et al. | |
| 6,142,413 A | 11/2000 | Dequin et al. | |
| 6,257,529 B1 | 7/2001 | Kubo et al. | |

(Continued)

FOREIGN PATENT DOCUMENTS

WO    WO-2004066433 A2    8/2004

OTHER PUBLICATIONS

Multiplex USA™, "Multiplex Digi Servos—The Third Generation of Multiplex Digital Servo Technology," http://www.multiplexrc.com/servo_digi.htm, accessed Dec. 30, 2002, 4 pages.

(Continued)

*Primary Examiner* — Tien Dinh
*Assistant Examiner* — Keith L Dixon
(74) *Attorney, Agent, or Firm* — Perkins Coie LLP

(57) ABSTRACT

Adjustable servomechanism assemblies and associated systems and methods. An unmanned aircraft system in accordance with one embodiment of the disclosure includes a movable mechanism and a servomechanism assembly operably coupled to the movable mechanism. The system also includes an interface assembly operably coupled to an output shaft of the servo and the movable mechanism. The interface assembly includes an adapter portion carried by the output shaft and an output arm releasably engaged with the adapter portion. The adapter portion includes a first aperture having a non-round surface mated with a non-round surface of the output shaft, and a non-splined, engagement surface. The output arm includes a second aperture sized to receive at least a portion of the outer surface of the adapter portion. The second aperture includes a generally smooth inner surface in contact with and rotatable through 360 degrees relative to the engagement surface of the adapter portion.

9 Claims, 7 Drawing Sheets

U.S. PATENT DOCUMENTS

| | | |
|---|---|---|
| 6,579,031 B2 | 6/2003 | Bien |
| 6,653,980 B2 | 11/2003 | Ceccom et al. |
| 6,685,138 B1 | 2/2004 | Krantz |
| 6,840,701 B2 * | 1/2005 | DaCunha et al. ............. 403/290 |
| 6,923,405 B2 | 8/2005 | Cline et al. |
| 6,954,182 B2 | 10/2005 | Knapp |
| 7,021,587 B1 | 4/2006 | Younkin |
| 7,182,297 B2 | 2/2007 | Jackson |
| 7,229,046 B2 * | 6/2007 | DuRant ....................... 244/76 A |
| 7,284,457 B2 * | 10/2007 | Jinno et al. ...................... 74/1 R |
| 7,331,548 B1 * | 2/2008 | Simkulet ...................... 244/225 |
| 7,367,740 B2 | 5/2008 | Lazic et al. |
| 7,501,731 B2 * | 3/2009 | Pettey ......................... 310/75 R |
| 7,600,715 B2 * | 10/2009 | Matsui ......................... 244/99.6 |
| 7,891,902 B2 * | 2/2011 | Pettey ........................... 403/313 |
| 2009/0212167 A1 | 8/2009 | Kunz |
| 2010/0237199 A1 | 9/2010 | Jackson |

OTHER PUBLICATIONS

Multiplex USA™, "R/C Servo Accessories," http://www.multiplexrc.com/acc_servo.html, accessed Dec. 30, 2002, 2 pages.

ServoCity "Servo to Shaft Couplers," http://www/servocity.com/html/servo_to_shaft_couplers.html accessed Sep. 3, 2003 1 page.

Unbenanntes Dokument, "10 mm (0.39") sized wingservos," http://www.volz-servos.com/english/servos/wingmazz_eng.html, accessed Dec. 30, 2002, 4 pages.

Unbenanntes Dokument, "Micro-Star-X," http://www.volzservos.com/english/servos/micstar_eng.html, accessed Dec. 30, 2002, 7 pages.

Unbenanntes Dokument, "Mini-Star 3," http://www.volzservos.com/english/servos/minista_eng.html, accessed Dec. 30, 2002, 2 pages.

Unbenanntes Dokument, "Mounting Instructions for Wing-Star / Wing Maxx,"http://www.volz-servos.com/english/mouninst.html, accessed Dec. 30, 2002, 2 pages.

Unbenanntes Dokument, "ZIP—the registered 11g (0.39 oz) Servo," http://www.volz-servos.com/english/servos/zip_eng.html, accessed Dec. 30, 2002, 3 pages.

Volz-Servos Deustch, http://www.volz-servos.com/english/servos/servos.html, accessed Dec. 30, 2002, 5 pages.

* cited by examiner

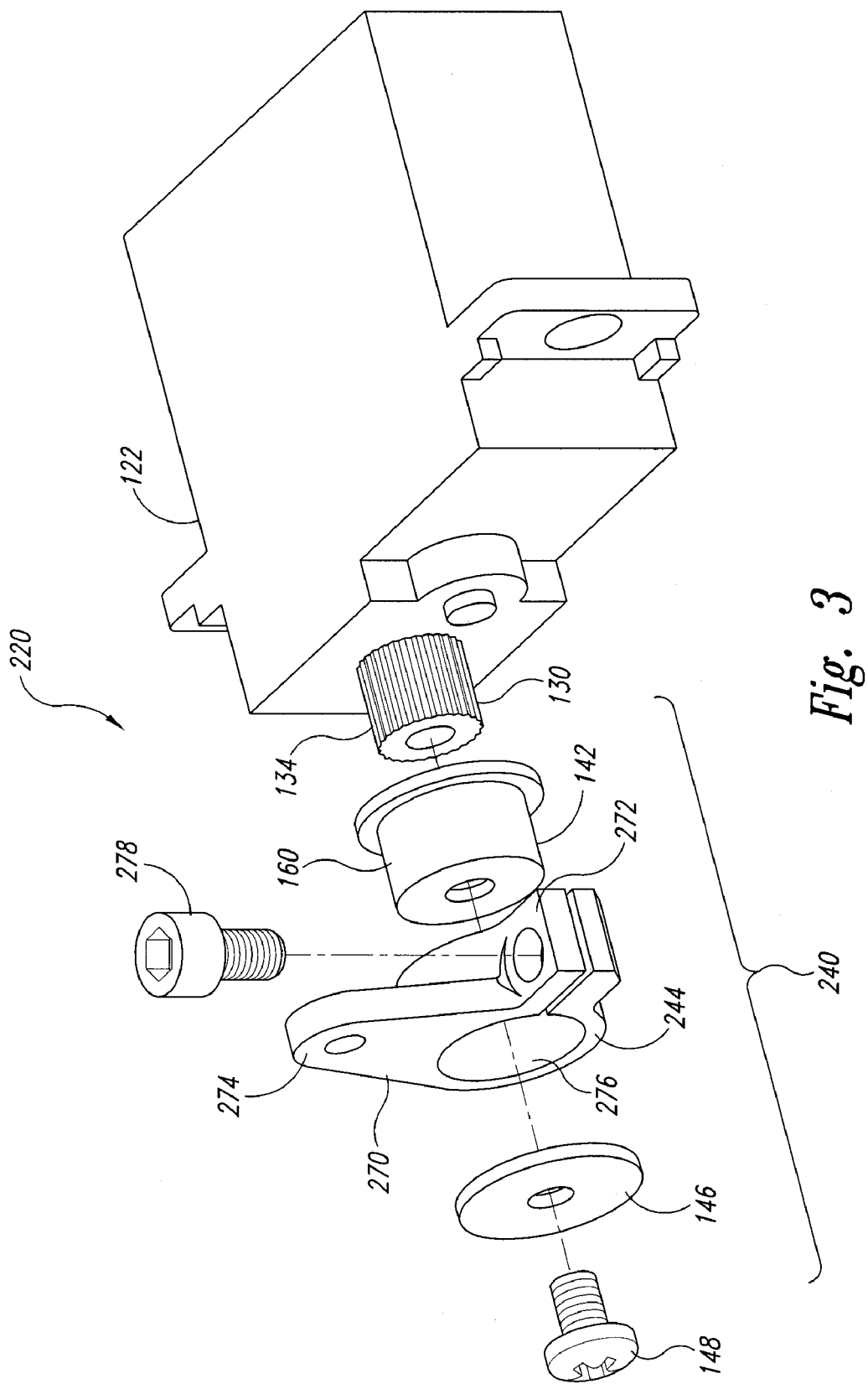

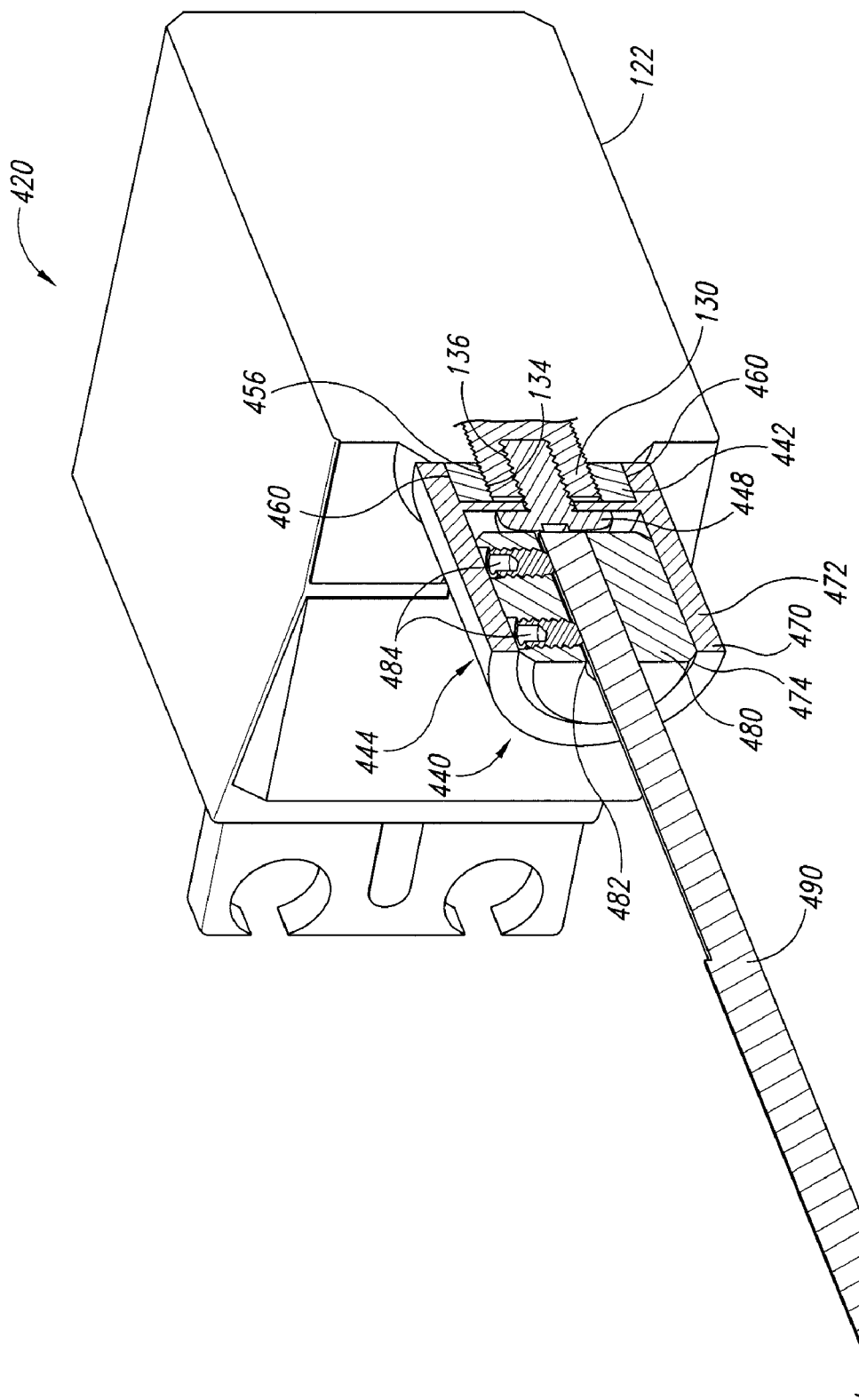

ADJUSTABLE SERVOMECHANISM ASSEMBLIES AND ASSOCIATED SYSTEMS AND METHODS

CROSS-REFERENCE TO RELATED APPLICATION(S)

This application is a divisional of U.S. patent application Ser. No. 12/406,908, filed on Mar. 18, 2009, entitled ADJUSTABLE SERVOMECHANISM ASSEMBLIES AND ASSOCIATED SYSTEMS AND METHODS, which is incorporated herein by reference in its entirety.

TECHNICAL FIELD

The present disclosure is directed generally to adjustable servomechanism assemblies and associated systems and methods. Several aspects of the present disclosure, more specifically, are directed toward adjustable servomechanism assemblies for both aircraft and non-aircraft systems.

BACKGROUND

Servomechanisms or servos are devices that use feedback or error-correction signals to control the desired operation of a mechanism. Servos typically include a motor (e.g., an electrical motor) that controls the angular orientation of an output shaft, which is in turn coupled to a movable control surface or component of a mechanical system. Servos generally function on the principle of negative feedback, where a control input is compared to the actual measured position of a mechanical system. Any difference between the actual and desired values (i.e., an "error signal") is used to drive the system in the direction necessary to reduce or eliminate the error. Servos, for example, are commonly used in unmanned aircraft or air vehicles to precisely and dynamically position control surfaces such as elevators and rudders.

One concern with many conventional servos, however, is that the orientation of the output shaft relative to the motor when the output shaft is at a neutral or "commanded center" position can vary between individual servos because of manufacturing and/or installation discrepancies. To compensate for these variances, each servo must be individually calibrated to precisely position the output shaft at the desired neutral location. Such calibration processes can be extremely time-consuming and expensive. Another concern with many conventional servos is that such systems have a limited adjustment resolution. For example, a typical double output arm servo used with many unmanned aircraft has an adjustment resolution of approximately 7.2 degrees. This arrangement yields only 25 discrete adjustment positions per 180 degrees and, accordingly, only relatively coarse adjustments can be performed when calibrating the servo.

SUMMARY

The following summary is provided for the benefit of the reader only, and is not intended to limit the disclosure in any way. An unmanned aircraft system in accordance with one embodiment of the disclosure, for example, can include a movable mechanism (e.g., a flight or aerodynamic control surface or another movable mechanism or device) and a servomechanism assembly operably coupled to the movable mechanism. The servomechanism assembly can include a servo motor and an output shaft operably coupled to the motor. The output shaft includes a first non-round surface. The system also includes an interface assembly operably coupled to the output shaft and the movable mechanism. The interface assembly includes an adapter portion carried by the output shaft and an output arm releasably engaged with the adapter portion. The adapter portion includes (a) a first aperture having a second non-round surface mated with the first non-round surface of the output shaft, and (b) a generally smooth, non-splined, engagement surface. The output arm includes a second aperture sized to receive at least a portion of the outer surface of the adapter portion. The second aperture includes a non-splined, generally smooth inner surface in contact with and rotatable through 360 degrees relative to the engagement surface of the adapter portion.

Another aspect of the disclosure is directed to a method for operating an unmanned aircraft. The method can include coupling a movable mechanism of the aircraft to a servomechanism carried by the aircraft with an interface assembly operably coupled to a linkage between the movable mechanism and the servomechanism. The interface assembly includes an adapter portion having a generally smooth, non-splined, engagement surface mated with a non-round surface of an output shaft of the servomechanism. The interface assembly also includes an output arm having an aperture method further includes inserting at least a portion of the adapter through the aperture in the output arm. The output arm is rotatably movable through 360 degrees relative to the engagement surface of the adapter portion. The method also includes rotating at least one of the output arm and the adapter portion relative to each other until the output arm is at a desired orientation relative to the output shaft.

BRIEF DESCRIPTION OF THE DRAWINGS

FIG. 3 is a partially schematic, exploded isometric illustration of a servomechanism assembly having an interface assembly configured in accordance with another embodiment of the disclosure.

FIG. 5A is a partially schematic, isometric cross-sectional view of a servomechanism assembly having an interface assembly configured in accordance with still another embodiment of the disclosure.

DETAILED DESCRIPTION

A. Embodiments of Adjustable Servomechanism Assemblies for Unmanned Aircraft and Associated Systems and Methods The present disclosure describes adjustable servomechanism assemblies and associated systems and methods. Many specific details of certain embodiments of the disclosure are set forth in the following description and in FIGS. 1-5B to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1:
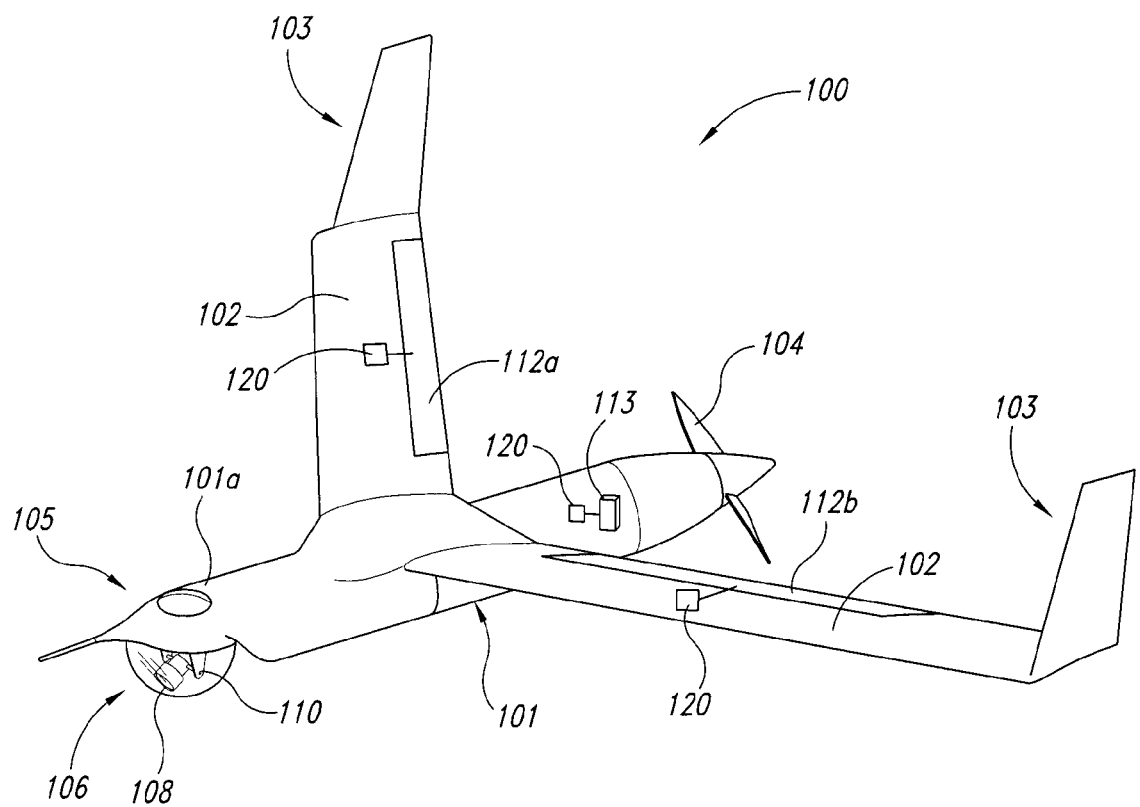
FIG. 1 is a partially schematic, isometric illustration of an unmanned aircraft having one or more servomechanism assemblies configured in accordance with an embodiment of the disclosure.

FIG. 1 is a partially schematic, isometric illustration of an unmanned aircraft 100 including one or more adjustable servomechanism assemblies configured in accordance with an embodiment of the disclosure. The unmanned aircraft 100 can include a fuselage 101, a pair of wings 102 extending outwardly from the fuselage 101, and a propeller 104 positioned at the aft end of the fuselage 101 to propel the aircraft 100 during flight. Each wing 102 can include an upwardly extending winglet 103 for lateral stability and control. A nose portion 105 of the fuselage 101 can include a turret assembly 106 having a device 108 (e.g., an imaging device, camera, surveillance sensor, or other payload) carried by a gimbal system 110 (shown schematically).

The aircraft 100 can also include one or more movable control surfaces (two ailerons 112a and 112b are shown in the illustrated embodiment) operably coupled to one or more adjustable servomechanism assemblies 120 (shown schematically). Although the ailerons 112a and 112b are the only control surfaces shown in FIG. 1, it will be appreciated that the aircraft 100 can include multiple aerodynamic control surfaces (e.g., rudder(s), elevators, stabilizers, ailerons, trailing and/or leading edge flaps, cowling flaps, attenuators, trim tabs, control tabs, speed brakes, etc.). The aircraft 100 may also include one or more servomechanism assemblies 120 operably coupled to other movable mechanisms or devices 113 (shown schematically) of the aircraft 100 (e.g., throttle controls, cylinder head temperature controls, carburetor heat controls, etc.). The foregoing is merely provided as representative lists of common movable aerodynamic control surfaces and mechanisms, and the aircraft 100 can include a number of other movable aerodynamic or non-aerodynamic control surfaces and/or mechanisms operably coupled to a servomechanism assembly 120. It will also be appreciated that although only a single servomechanism assembly 120 is coupled to each aileron 112a and 112b shown in FIG. 1, a different number of servomechanism assemblies 120 may be coupled to the ailerons 112a-b and/or the other movable surfaces and/or mechanisms 113 of the aircraft in other embodiments.

As described in detail below, embodiments of the servomechanism assemblies 120 are configured to provide universal adjustability between an output shaft of the individual servomechanism and a control mechanism or linkage interface of the corresponding servomechanism. Compared with conventional servomechanism assemblies that have a limited or finite adjustment resolution (e.g., 7.2 degrees) between the output shaft and the control mechanism, the interface of the servomechanism assembly 120 can rotate freely through 360 degrees and can be releasably secured when the interface is in the desired position. Further details regarding the adjustable servomechanism assemblies 120 are described below with reference to FIGS. 2A-5B.

Figure 2A:
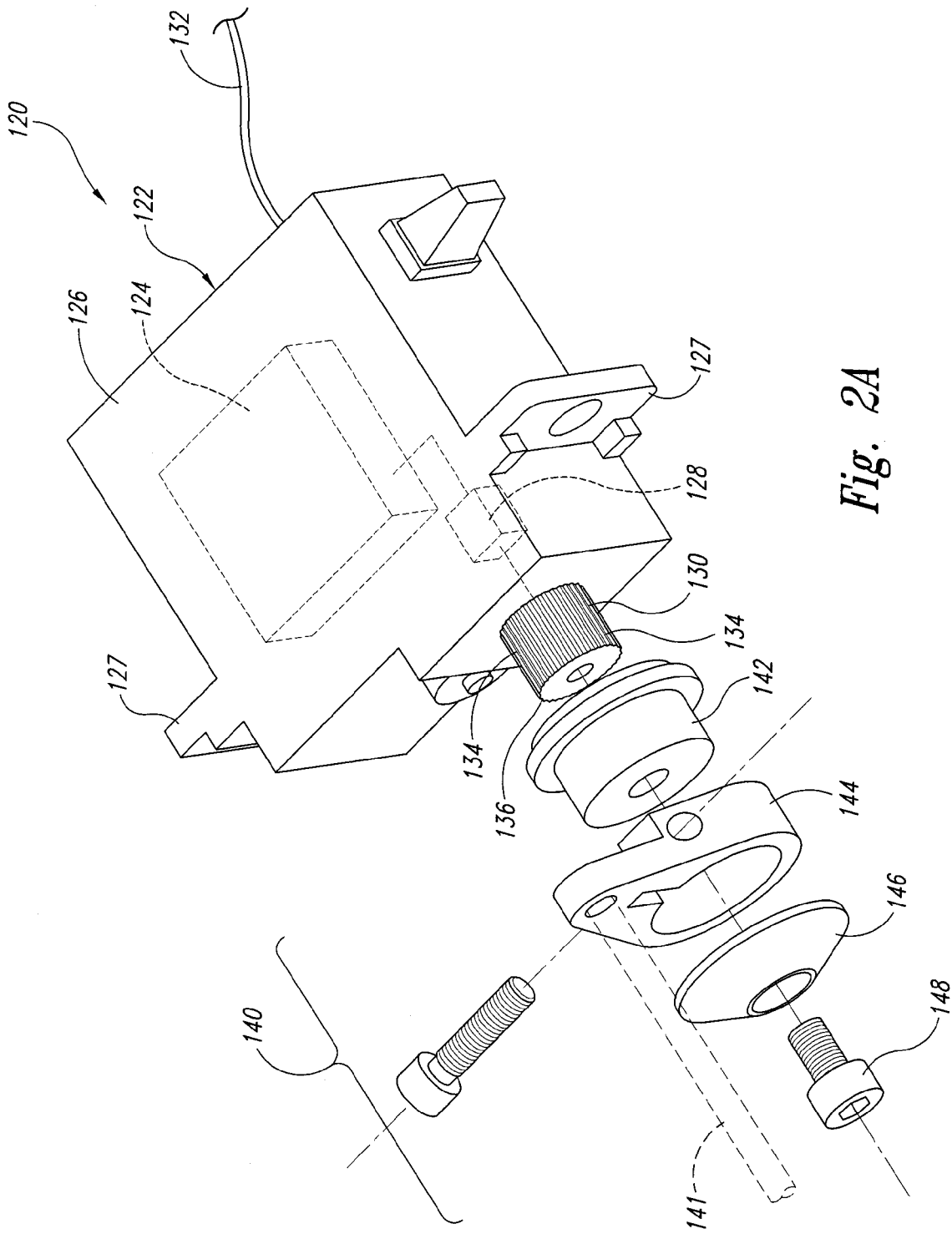
FIG. 2A is a partially schematic, exploded isometric illustration of a servomechanism assembly configured in accordance with an embodiment of the disclosure.

FIG. 2A is a partially schematic, exploded isometric illustration of a servomechanism assembly 120 before installation in the aircraft 100 (FIG. 1). The servomechanism assembly 120 includes a servo 122 and an interface assembly 140 coupled to the servo 122. The interface assembly 140 is operably coupled to a mechanical linkage (not shown) used to provide actuation forces to the ailerons 112a-b (FIG. 1) or various other control surfaces or mechanical systems of the aircraft 100 (FIG. 1). Further details regarding the interface assembly 140 are provided below with reference to FIGS. 2B and 2C.

The servo 122 can include an electric motor 124 (shown schematically) carried within a servo housing 126. The servo housing 126 can include one or more attachment or mounting portions 127 to attach the servomechanism assembly 120 to corresponding attachment portions on the aircraft 100 (FIG. 1). The motor 124 is mechanically linked to a potentiometer 128, which is in turn connected to an output arm or shaft 130 projecting from the housing 126. As discussed in greater detail below, the interface assembly 140 is coupled to the output shaft 130. A control wire or electrical connector 132 is coupled to the servo 122 and is configured to transmit signals between the servo 122 and other components of the aircraft.

In operation, control signals sent to the servo 122 (e.g., pulse width modulation signals) are translated into position commands by control circuitry (not shown) of the servo 122, and the output shaft 130 can be rotated to a desired angular position. The potentiometer 128 is configured to help the control circuitry monitor the current position of the motor 124 and output shaft 130. If the output shaft 130 is at the correct angle, then the motor 124 shuts off. However, if the control circuitry detects that the angle is not correct, the motor 124 can be turned the appropriate direction until the angle is correct and the output shaft 130 reaches the commanded position. The output shaft 130 is typically configured to control angular motion of between approximately 0 and 210 degrees (e.g., approximately 0 to 180 degrees). This range can vary, however, based upon the manufacturer of the servo, the particular application in which the servo 122 will be used, and a number of other factors.

The output shaft 130 of the servomechanism assembly 120 has a non-round surface. For example, the output shaft 130 can include a plurality of splines or teeth 134. As is known to those of ordinary skill in the art, the configuration of the splines 134 is typically unique for a particular manufacturer of the servo 122. For example, servos manufactured by Futaba Corporation typically have a particular number and arrangement of splines 134, while servos manufactured by another company (e.g., Hitec, Robotzone, etc.) may have a different number and/or arrangement of splines 134. The output shaft 130 can also include a threaded aperture 136 for receiving a fastener (e.g., a bolt) to secure the interface assembly 140 in place after engagement, as described in greater detail below with respect to FIGS. 2B and 2C.

As mentioned above, the interface assembly 140 is coupled to the output shaft 130 and is configured to operably couple the movable control surfaces (e.g., the ailerons 112a and 112b of FIG. 1) or movable mechanism 113 (FIG. 1) to the servo 122 via an arm or linkage 141 (shown schematically in broken lines). The interface assembly 140 includes an adapter portion 142 and an adjustable output arm 144 configured to mate with or otherwise engage the adapter portion 142. The interface assembly 140 can also include a retaining member 146 (e.g., a washer) positioned to engage an outboard side of the output arm 144. The retaining member 146 is an optional component that is not included in some embodiments. The interface assembly 140 can be secured to the output shaft 130 with a fastener 148 (e.g., a bolt) after the adapter portion 142 and output arm 144 are in place and have the desired arrangement relative to each other.

Figure 2B:
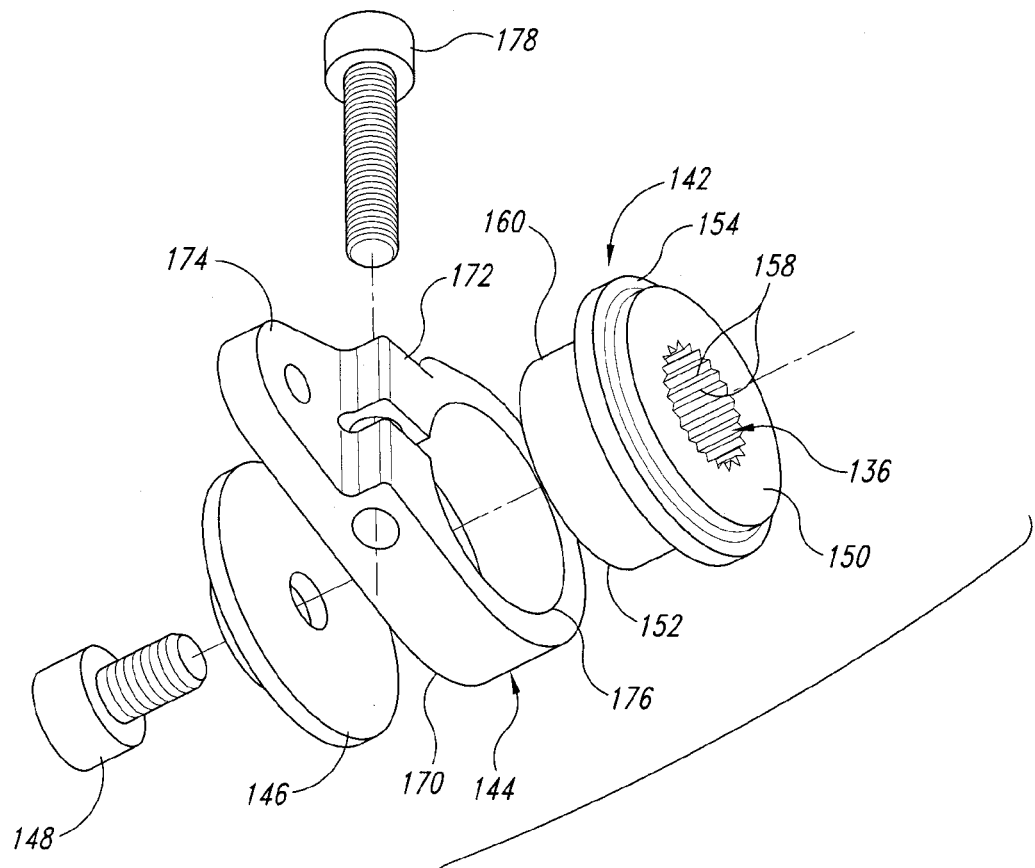
FIG. 2B is a partially schematic, exploded isometric illustration of an interface assembly of the servomechanism assembly of FIG. 2A.
Figure 2C:
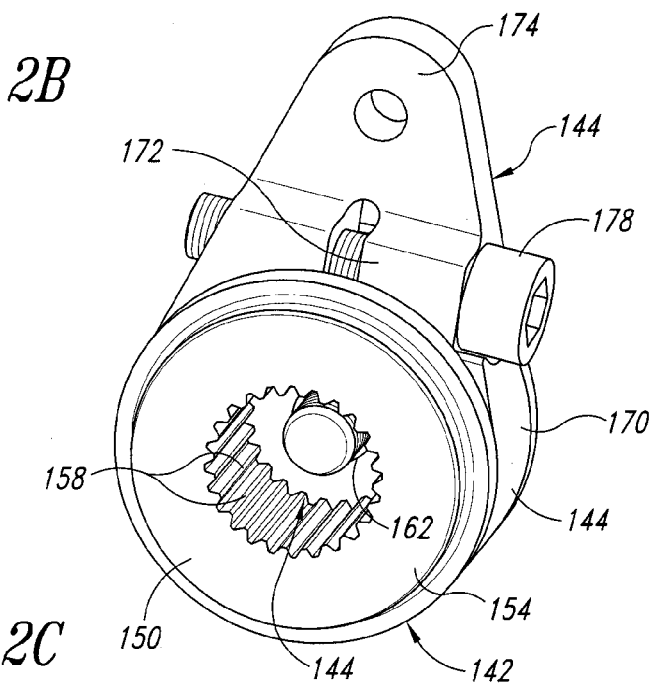
FIG. 2C is a partially schematic, isometric illustration of the interface assembly of FIG. 2B in an assembled configuration.

FIG. 2B is a partially schematic, exploded isometric illustration of the interface assembly 140 before installation with the servo 122, and FIG. 2C is a partially schematic, isometric illustration of the interface assembly 140 in an assembled configuration. Referring to FIGS. 2B and 2C together, the adapter portion 142 is a generally barrel-shaped component having a first side 150 and a second side 152 opposite the first side 150. The first side 150 includes a head portion 154 positioned for engagement with the servo housing 126. An aperture or opening 156 extends through at least a portion of the adapter portion 142 and includes a non-round surface configured to mate with the non-round surface of the output shaft 130. In the illustrated embodiment, for example, the aperture 156 includes a plurality of splines or teeth 158 configured to mate with the splines 134 of the output shaft 130. The splines 158 can have a variety of different configurations based, at least in part, on the particular configuration of the splines 134 of the output shaft 130.

The second side 152 of the adapter portion 142 includes an engagement portion 160 positioned for engagement with the output arm 144. As best seen in FIG. 2B, the engagement portion 160 is a generally smooth, non-splined surface configured to receive at least a portion of the output arm 144. The adapter portion 142 accordingly converts the splined output shaft 130 into a generally smooth, cylindrical shaft configured to allow the output arm 144 to freely rotate about the engagement portion 160 to provide universal angular adjustment of the output arm 144. As best seen in FIG. 2C, the second side 152 of the adapter portion 142 also includes a threaded aperture 162 configured to receive a portion of the fastener 148. The adapter portion 142 can be composed of a variety of different materials (e.g., plastic, metal, etc.). In other embodiments, the adapter portion 142 can have a different configuration and/or include different features.

As mentioned above, the adjustable output arm 144 has a clamping or attachment feature configured to mate with the adapter portion 142 and operably couple the servo 122 to the arm or linkage 141 (FIG. 2A) from the moveable control surface or device. As best seen in FIG. 2B, for example, the output arm 144 includes a body 170 having an adjustable collar portion 172 and an attachment portion 174 positioned for attachment to the linkage (FIG. 2A). The output arm 144 also includes an aperture or opening 176 sized to receive at least a portion of the engagement portion 160 of the adapter 142 and freely move about the engagement portion 160 when the output arm 144 is engaged with the adapter 142. The collar portion 172 is configured to clamp down or press against the adapter portion 142 when the output arm 144 is at a desired position relative to the adapter 142 and/or the servo 122 (FIG. 2A) with the servo commanded to center. For example, the aperture 176 can have (a) a first dimension sized to receive the engagement portion 160 and allow the output arm 144 to freely move relative to the adapter portion 142, and (b) a second dimension less than the first dimension such that the output arm 144 compressibly engages the engagement portion 160. As best seen in FIG. 2C, for example, a set screw 178 or other suitable fastener can be engaged with the collar portion 172 to secure the output arm 144 in place against the adapter portion 142.

As discussed above, the interface assembly 140 further includes the retaining member 146 positioned to engage an outboard side 171 of the output arm 144, and a fastener 148 to secure the interface assembly 140 to the output shaft 130 (FIG. 2A). In other embodiments, however, the clamping force provided by the collar portion 172 is sufficient and the retaining member 146 is excluded. The interface assembly 140 is accordingly positioned to transfer torque from the output shaft 130 (FIG. 2A) without slipping or rotating, which can result in an inadvertent loss of control or misalignment and subsequent loss of calibration. The output arm 144 can be composed of a variety of different materials (e.g., plastic, metal, etc.). Moreover, in other embodiments the output arm 144 can include different features and/or have a different arrangement.

One feature of the interface assembly 140 described above with reference to FIGS. 1-2C is that the assembly is configured to provide adjustability of arbitrarily small increments (e.g., infinitely small increments) between the output arm 144 and the output shaft 130 of the servo 122. For example, as described above, the servo 122 can set the output shaft 130 to a desired position (e.g., commanded to center), the adapter portion 142 and output arm 144 can be installed with the output shaft 130, and the output arm 144 can rotate freely through 360 degrees relative to the adapter portion 142 and can be secured or clamped in place at a desired position. The arrangement and/or geometry of the mechanical linkage between the servo 122 and the control surface can remain unchanged while the interface assembly 140 is adjusted relative to the output shaft. One advantage of this feature is that it can compensate for the variability between different servos when the individual servo output shafts 130 are commanded to a standard center of 1.5 milliseconds.

The interface assembly 140 is expected to eliminate the need for individual calibrations of each servo, thereby allowing for one master or common calibration. For example, to calibrate multiple servomechanism assemblies 120 coupled to identical or generally similar components (e.g., elevator servos) on different aircraft having a common design, an operator can simply tighten the output arm 144 at a desired position relative to the output shaft 130 on each servomechanism 120 using a common calibration from aircraft to aircraft. This feature is expected significantly reduce the costs and complexity associated with installation and maintenance of the aircraft's control system, and provide consist servo performance. Still another feature of the interface assembly 140 is that the assembly allows for more multiple servos to be used to operate one device without the servos "fighting" or conflicting with each other due to variances in output shaft positions at center. For example, the interface assembly 140 can eliminate the need for electronic circuitry to match the servos when multiple servos are ganged to operate on a single device.

C. Additional Embodiments of Adjustable Servomechanism Assemblies for Unmanned Aircraft and Associated Systems and Methods FIGS. 3-5B are partially schematic, exploded isometric illustrations of servomechanism assemblies configured in accordance with other embodiments of the disclosure. The servomechanism assemblies of FIGS. 3-5B can be used with the aircraft 100 of FIG. 1 or other suitable aircraft or related systems. In addition, the servomechanism assemblies described below can include many of the same features and advantages of the servomechanism assembly 120 described above with reference to FIGS. 1-2C.

FIG. 3, for example, is a partially schematic, exploded isometric illustration of a servomechanism assembly 220 having an interface assembly 240 configured in accordance with another embodiment of the disclosure. The servomechanism assembly 220 differs from the servomechanism assembly 120 described above in that the interface assembly 240 includes an output arm 244 having a different configuration than the output arm 144 of the interface assembly 140. More specifically, the output arm 244 includes a body 270 having an adjustable collar portion 272 circumferentially spaced apart from an attachment portion 274. The output arm 244 also includes an aperture or opening 276 sized to receive at least a portion of the engagement portion 160 of the adapter 142.

In operation, the output arm 244 can function generally similar to the output arm 144 described above. For example, the collar portion 272 is configured to clamp down or press against the adapter portion 142 when the output arm 244 is at a desired position relative to the adapter 142 and/or the servo 122 with the servo commanded to center. A set screw 278 or other suitable fastener can be engaged with the collar portion 272 to secure the output arm 144 at the desired location. In other embodiments, the output arm 244 may have a different configuration and/or include different features. For example, in other embodiments the collar portion 272 can have a different configuration and/or arrangement relative to the attachment portion 274.

Figure 4A:
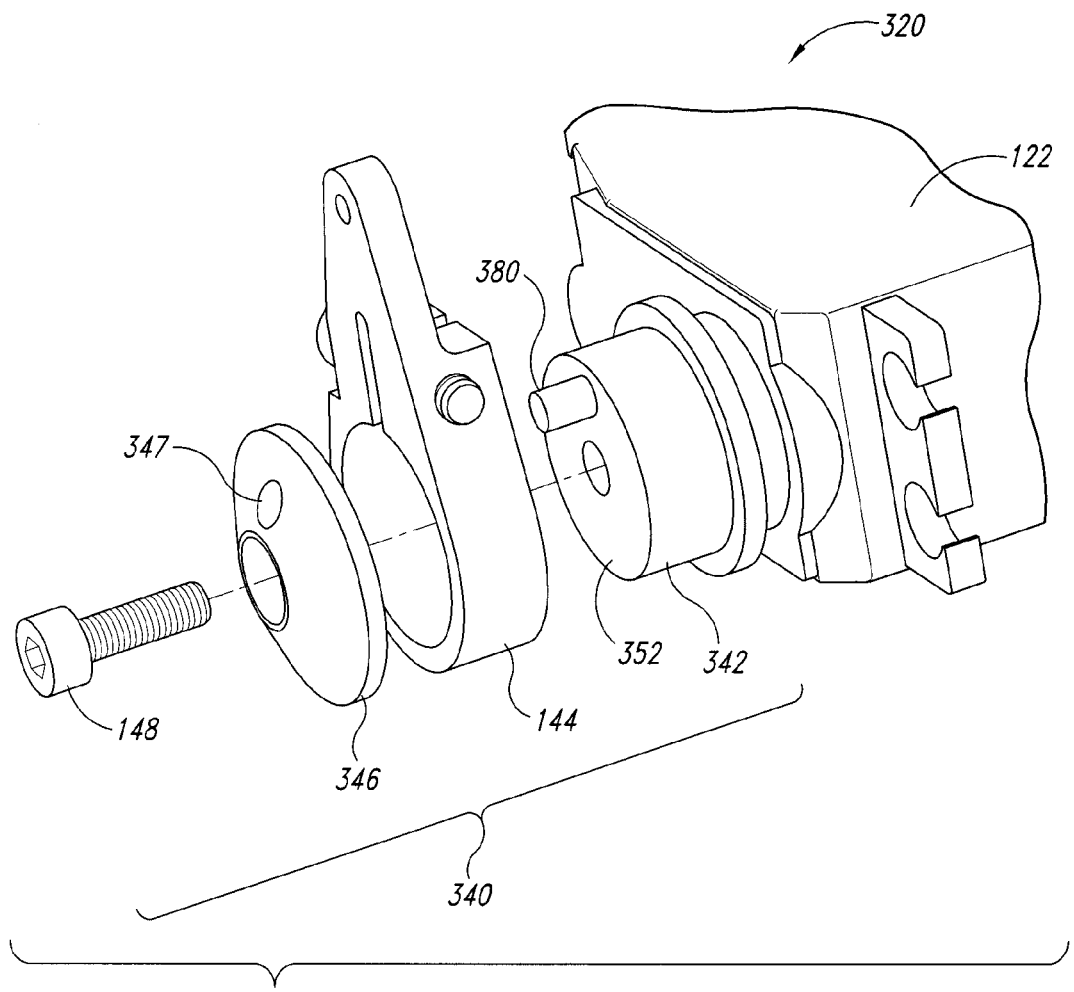
FIG. 4A is a partially schematic, exploded isometric illustration of a servomechanism assembly having an interface assembly configured in accordance with still another embodiment of the disclosure.
Figure 4B:
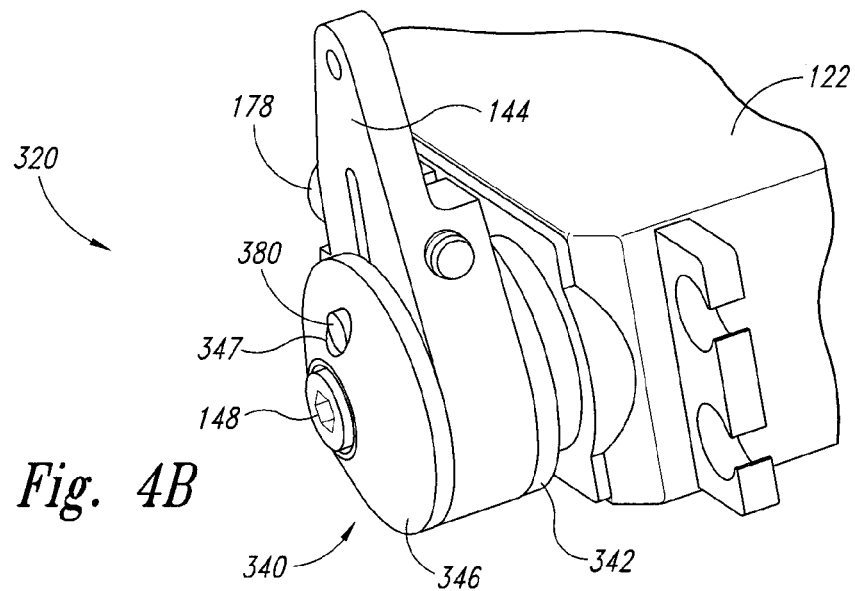
FIG. 4B is a partially schematic, isometric illustration of the interface assembly of FIG. 4A in an assembled configuration.

FIG. 4A is a partially schematic, exploded isometric illustration of a servomechanism assembly 320 having an interface assembly 340 configured in accordance with still another embodiment of the disclosure. FIG. 4B is a partially schematic, isometric illustration of the interface assembly 340 in an assembled configuration. Referring to FIGS. 4A and 4B together, the interface assembly 340 differs from the interface assemblies 140 and 240 described above in that the interface assembly 340 includes an adapter portion 342 having an alignment feature 380 extending from a second side 352 of the adapter portion 342. As best seen in FIG. 4A, for example, the alignment feature 380 is a generally cylindrical projection extending outwardly away from the second side 352 of the adapter portion 342. The interface assembly 340 further includes a retaining member 346 having an aperture 347 positioned to receive at least a portion of the alignment feature 380.

As best seen in FIG. 4B, when the interface assembly 340 has a desired arrangement (e.g., the output arm 144 is at a desired orientation relative to the output arm 130 (FIG. 2A)), the retaining member 346 can be engaged with an outboard side of the output arm 144 and the entire assembly can be secured to the servo 122 with the fastener 148. Positioning at least a portion of the alignment feature 380 within the aperture 347 of the retaining member 346 can help further prevent the components of the interface assembly 340 from inadvertently rotating or moving relative to each other and/or the output shaft 130 (FIG. 2A) during operation. In other embodiments, the alignment feature 380 can have a different configuration and/or include different features. For example, the alignment feature 380 can have a different shape (e.g., square, rectilinear, etc.) and the aperture 347 in the retaining member 346 can have a corresponding shape.

Figure 5B:
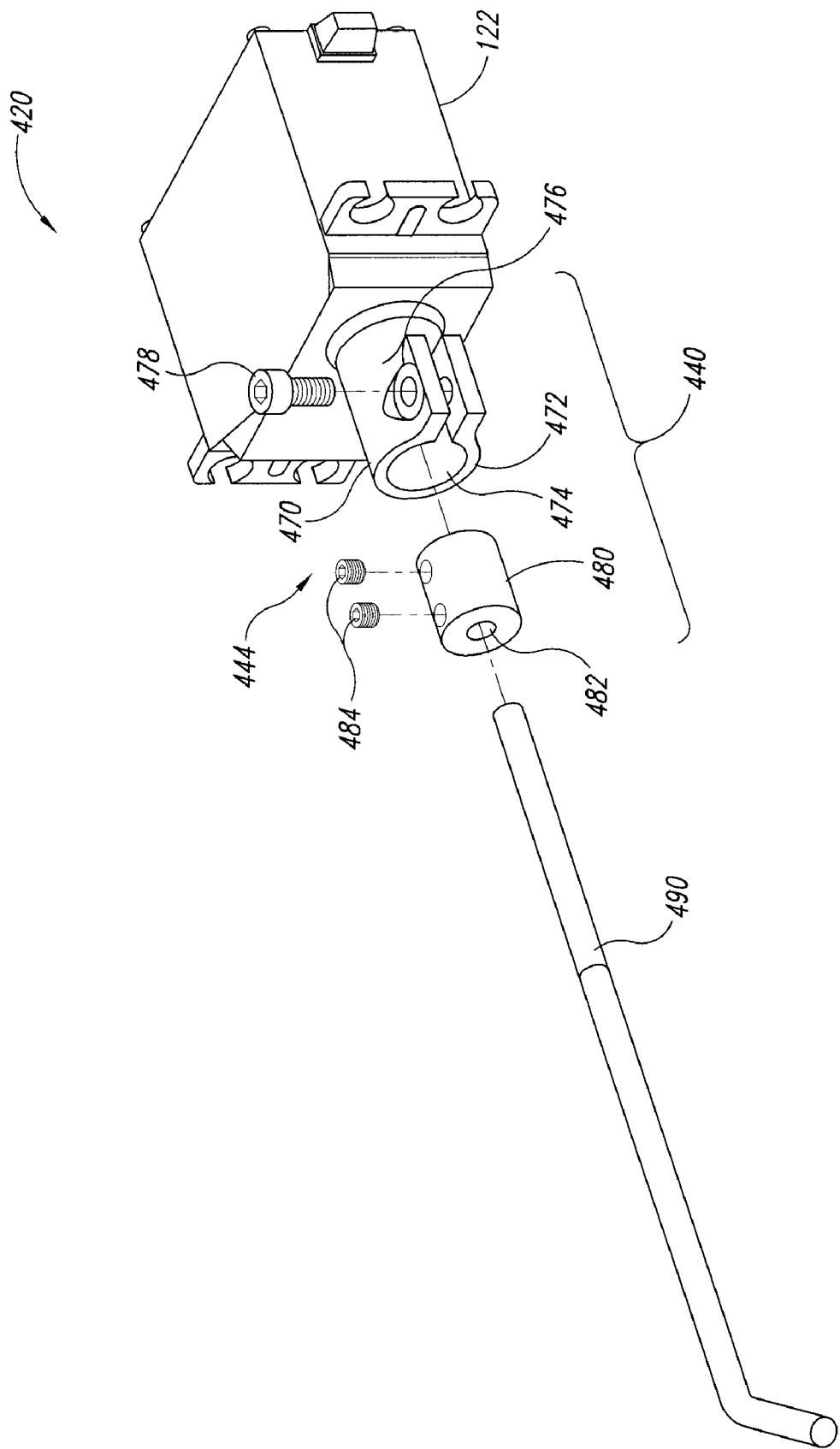
FIG. 5B is a partially schematic, exploded isometric illustration of the servomechanism assembly and interface assembly of FIG. 5A.

FIG. 5A is a partially schematic, isometric cross-sectional view of a servomechanism assembly 420 having an interface assembly 440 configured in accordance with still another embodiment of the disclosure, and FIG. 5B is a partially schematic, exploded isometric illustration of the servomechanism assembly 420 and interface assembly 440. Referring first to FIG. 5A, the interface assembly 440 includes an adapter portion 442 configured to mate with the output shaft 130 of the servo 122. The adapter portion 442 can be generally similar to the adapter portions described above. For example, the adapter portion 442 can have a splined aperture or opening 456 configured to mate with the splines 134 of the output shaft 130, and a generally smooth cylindrical outer surface 460.

Referring to FIGS. 5A and 5B together, the interface assembly 440 also includes an adjustable output or clamping feature 444 configured to engage the adapter portion 442. In this embodiment, the output feature 444 includes a first member 470 configured to directly engage the adapter portion 442 and a second member 480 configured to engage the linkage or arm 490 to the movable control surface or device (not shown). More specifically, the first member 470 is a collar or sleeve having a body 472, an aperture 474 sized to fit over at least a portion of the adapter portion 442, and an adjustable collar portion 476 configured to clamp down or press against the adapter portion 442 and the second member 480. As best seen in FIG. 5B, a set screw 478 or other suitable fastener can be engaged with the collar portion 476 to secure the first member 470 in place against the adapter portion 442.

The second member 480 is a generally cylindrical member sized to be received within at least a portion of the aperture 474 of the first member 470. The second member 480 further includes an aperture or opening 482 configured to receive a portion of the linkage or arm 490. One or more set screws 484 (two are shown in the illustrated embodiment) can be used to hold the linkage or arm 490 in place relative to the second member 480. As best seen in FIG. 5A, the interface assembly 440 further includes a fastener 448 (e.g., a bolt) mated with the threaded aperture 136 of the output shaft 130 secure the interface assembly 440 in place when the interface assembly 440 is at a desired orientation relative to the output shaft 130. In other embodiments, the interface assembly 440 can include different features and/or have a different arrangement.

From the foregoing, it will be appreciated that specific embodiments of the disclosure have been described herein for purposes of illustration, but that various modifications can be made without deviating from the spirit and scope of the disclosure. For example, the interface assemblies and/or servomechanisms described above with reference to FIGS. 1-5B may have a different configuration and/or include different features. Moreover, specific elements of any of the foregoing embodiments can be combined or substituted for elements in other embodiments. For example, the interface assemblies described in the context of specific aircraft systems can be implemented in a number of other aircraft or non-aircraft systems (e.g., automotive applications, medical device applications, industrial applications, etc.) that include servomechanisms operably coupled to movable control surfaces or components of a mechanical system. Certain aspects of the disclosure are accordingly not limited to aircraft systems. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

I claim:

1. A method for operating an unmanned aircraft, the method comprising:
coupling a movable mechanism of the aircraft to a servomechanism carried by the aircraft with an interface assembly operably coupled to a linkage between the movable mechanism and the servomechanism, wherein the interface assembly includes—
an adapter portion mated with a non-round surface of an output shaft of the servomechanism, wherein the adapter portion includes a generally smooth, non-splined, engagement surface; and
an output arm having an aperture sized to receive at least a portion of the engagement surface of the adapter portion;
inserting at least a portion of the adapter through the aperture in the output arm, wherein the output arm is rotatably movable through 360 degrees relative to the engagement surface of the adapter portion; and rotating at least one of the output arm and the adapter portion relative to each other until the output arm is at a desired orientation relative to the output shaft.

2. The method of claim 1 wherein rotating at least one of the output arm and the adapter portion relative to each other comprises adjusting the orientation of the output arm without changing a geometry of the linkage.

3. The method of claim 1 wherein rotating at least one of the output arm and the adapter portion relative to each other comprises adjusting the orientation of the output arm with the servo commanded to center.

4. The method of claim 1 wherein the aperture in the output arm has (a) a first diameter sized such that the output arm can freely move through 360 degrees relative to the outer surface of the adapter, and (b) a second diameter less than the first diameter, and wherein the method further comprises:

changing the diameter of the aperture from the first diameter to the second diameter such that the output arm is releasably secured to the adapter portion and generally non-rotatable when the output arm is at the desired position.

5. The method of claim 4 wherein the output arm further comprises an adjustable collar portion positioned to receive a fastener, and wherein changing the diameter of the output arm from the first diameter to the second diameter comprises rotating the fastener relative to the collar portion to change the aperture between the first and second diameters.

6. The method of claim 1, further comprising releasably securing the output arm relative to the adapter portion and the output shaft with a fastener.

7. The method of claim 1 wherein coupling the movable mechanism to a servomechanism comprises coupling a first servomechanism having a first interface assembly to the movable mechanism, and wherein the method further comprises coupling a second servomechanism having a second interface assembly at least approximately identical to the first interface assembly to the movable mechanism.

8. The method of claim 1 wherein coupling a movable mechanism of the aircraft to a servomechanism comprises coupling an aerodynamic control surface of the aircraft to the servomechanism.

9. The method of claim 1 wherein coupling a movable mechanism of the aircraft to a servomechanism comprises coupling at least one of a throttle control, cylinder head temperature control, and carburetor heat control to the servomechanism.

* * * * *